United States Patent

[11] 3,603,611

| [72] | Inventor | Graham J. Wenham<br>Tyseley, Birmingham, England |
|---|---|---|
| [21] | Appl. No. | 825,844 |
| [22] | Filed | May 19, 1969 |
| [45] | Patented | Sept. 7, 1971 |
| [73] | Assignee | Girling Limited |
| [32] | Priority | June 6, 1968 |
| [33] | | Great Britain |
| [31] | | 27,032/68 |

[54] VEHICLE-LEVELLING SYSTEMS
5 Claims, 1 Drawing Fig.

| [52] | U.S. Cl. | 280/124,<br>267/65 |
|---|---|---|
| [51] | Int. Cl. | B60g 11/26 |
| [50] | Field of Search | 267/65 D;<br>280/124 F, 6, 6.1, 6.11 |

[56] References Cited
UNITED STATES PATENTS

| 2,939,723 | 6/1960 | Wisniewski | 280/124 F |
| 3,037,788 | 6/1962 | Haddad | 280/124 F |

*Primary Examiner*—Philip Goodman
*Attorney*—Scrivener, Parker, Scrivener and Clarke

ABSTRACT: This invention relates to a pneumatically operable automatic levelling system for a motor vehicle including a motor/compressor/dryer unit, a reservoir for storing air under pressure, at least one vehicle-levelling strut, a valve for controlling the flow of air under pressure to and from the strut to maintain the vehicle level, and a pressure-sensitive switch for switching off the motor of the unit when the pressure of air in the reservoir reaches a preset upper limit.

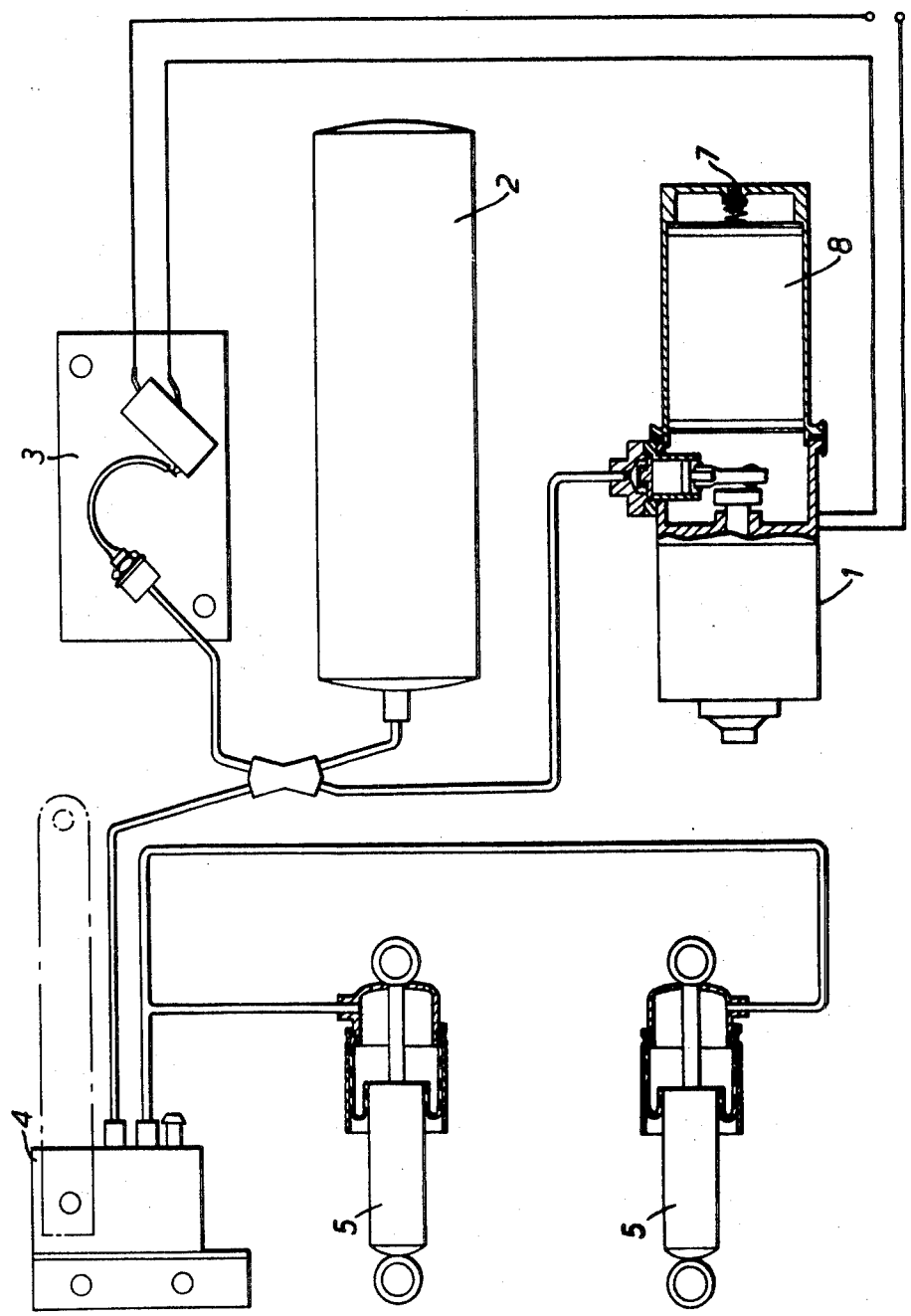

VEHICLE-LEVELLING SYSTEMS

This invention relates to automatic leveling systems for vehicles.

According to the invention there is provided a pneumatically operable automatic leveling system for a motor vehicle, comprising a motor/compressor/dryer unit, a reservoir for storing air under pressure, one or more vehicle-leveling struts, a valve for controlling the flow of air under pressure to and from the strut or struts to maintain the vehicle level, and a pressure-sensitive switch means for switching off the motor of said unit when the pressure of air in the reservoir reaches a preset upper limit.

In order that the invention may be better understood, the preferred embodiment thereof, which is given by way of example only, will now by described with reference to the accompanying drawing which schematically shows a vehicle automatic leveling system.

The system comprises a conventional motor/compressor/dryer unit 1, a pressure reservoir 2, a pressure switch 3, a height-sensing valve 4 and leveling struts 5.

In operation, the motor/compressor/dryer unit 1 draws air from the atmosphere through a nonreturn valve 7 in the dryer section 8. The dried air is then compressed and stored in the reservoir 2 until a preset upper pressure limit is reached. At that point the pressure switch 3 operates to switch off the motor. As air is used in the leveling system, the reservoir pressure falls and at a preset pressure drop of 25 to 30 p.s.i., the motor cuts in again. The pressure lag is obtained by the pressure switch being a constant high hysteresis switch mechanism incorporating Bourdon tube actuation.

The height-sensing valve 4 monitors the pressure in the struts 5 (of which only two are shown in the drawing) to maintain a constant height either by drawing high-pressure air from the reservoir 2 to pressurize the struts and hence raise the vehicle or by exhausting the struts to atmosphere thus lowering the vehicle.

The height-sensing valve 4 is preferably constructed as described in our Pat. application No. 32754/68 so as to incorporate tipping valves for controlling the pressurizing and exhausting of the struts 5.

A mechanism is included in the height-sensing valve 4 to ensure that the strut pressure does not fall below a specified minimum valve.

What I claim is:

1. A pneumatically operable, automatic leveling system for a motor vehicle, comprising a motor/compressor/dryer unit, a reservoir for storing air under pressure, one or more vehicle leveling struts, a valve for controlling the flow of air under pressure to and from the strut or struts to maintain the vehicle level, and a pressure-sensitive switch means for switching off the motor of said unit when the pressure of air in the reservoir reaches a preset upper limit.

2. A system according to claim 1, wherein the switch means after switching off the motor is operable to permit the pressure in the reservoir to drop by a preset amount before switching the motor on again.

3. A system according to claim 2, wherein the switch means includes a constant high hysteresis switch mechanism incorporating Bourdon tube actuation.

4. A system according to claim 2, wherein the preset pressure drop is 25–30 p.s.i.

5. A system according to claim 1, wherein the valve is operable to ensure that the pressure of air in the strut or struts does not fall below a specified minimum valve.